United States Patent [19]
Ueno et al.

[11] Patent Number: 6,076,025
[45] Date of Patent: Jun. 13, 2000

[54] MOBILE ROBOT STEERING METHOD AND CONTROL DEVICE

[75] Inventors: Ichirou Ueno; Hironori Katou, both of Saitama, Japan

[73] Assignee: Honda Giken Kogyo K.K., Tokyo, Japan

[21] Appl. No.: 09/015,312

[22] Filed: Jan. 29, 1998

[30] Foreign Application Priority Data

Jan. 29, 1997 [JP] Japan .................................. 9-029768

[51] Int. Cl.$^7$ ............................................... G06F 165/00
[52] U.S. Cl. ................................. 701/23; 701/25; 701/26
[58] Field of Search .................... 701/23, 25, 26

[56] References Cited

U.S. PATENT DOCUMENTS

| | | | |
|---|---|---|---|
| 4,939,650 | 7/1990 | Nishikawa | 364/424.02 |
| 5,081,585 | 1/1992 | Kurami et al. | 364/424.02 |
| 5,377,106 | 12/1994 | Drunk et al. | 364/424.02 |
| 5,548,511 | 8/1996 | Bancroft | 364/424.02 |
| 5,570,285 | 10/1996 | Asaka et al. | 364/424.02 |
| 5,925,080 | 6/1999 | Shimbara et al. | 701/23 |

*Primary Examiner*—Tan Nguyen
*Assistant Examiner*—Dalena Tran
*Attorney, Agent, or Firm*—Armstrong, Westerman, Hattori, McLeland & Naughton

[57] ABSTRACT

A robot is provided to run so that a trace of the robot efficiently covers a given area according to the detection of a boundary of the area. A spiral pattern running, wherein a radius of the spiral is gradually increased, is started at a desired location in the area and is paused upon the detection of a boundary wall by sensors. Then, a random pattern running, which includes turning to depart from the wall and running forward, is conducted. After the turning has been repeated a predetermined number of times through simulations, the spiral pattern running is resumed at a location spaced from the last turning spot by a predetermined distance or a predetermined length of running time.

19 Claims, 13 Drawing Sheets

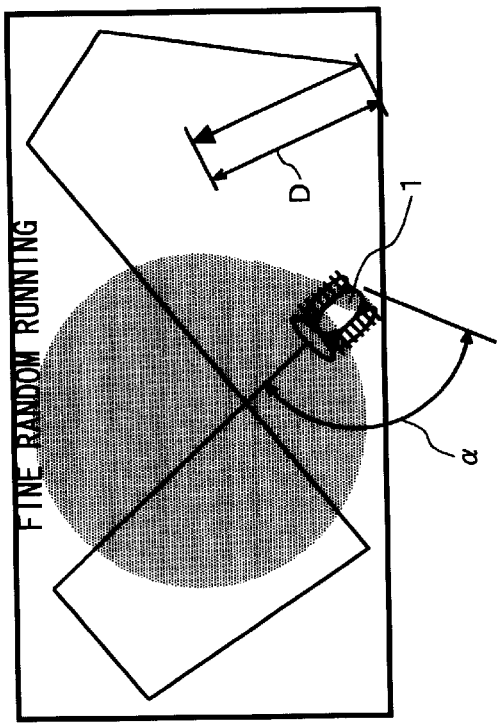
FIG. 6B  FINE RANDOM RUNNING
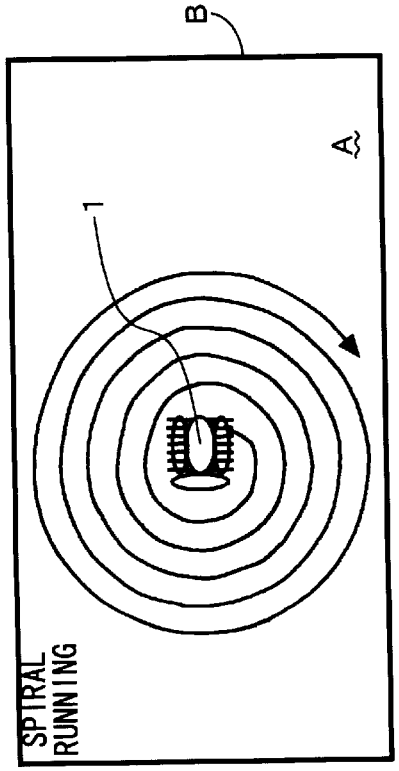
FIG. 6A  SPIRAL RUNNING
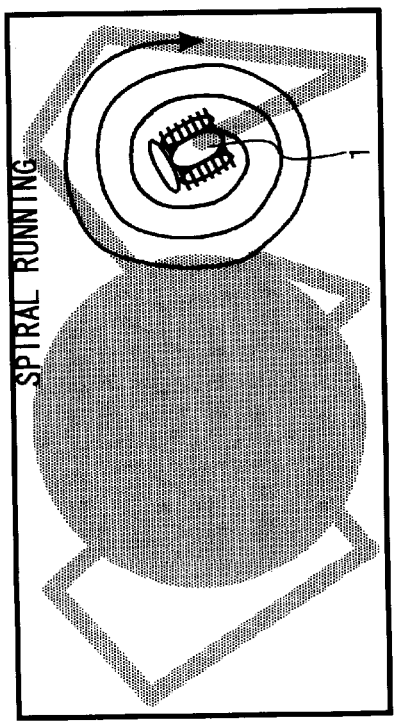
FIG. 6C  SPIRAL RUNNING

FIG. 13

| SENSOR NAME | SENSOR DETECTION | MOTION SCHEME | PARAMETERS TRANSFERRED TO SUCCEEDING MOTION TO BE SELECTED | | | |
|---|---|---|---|---|---|---|
| | | | TREAD SPEED | | TURNING | |
| | | | INTRA-SIDE | OPPOSITE-SIDE | LEVEL | DIRECTION |
| 6SR | OVER 0.5m | STRAIGHT | HIGH | HIGH | — | — |
| | 0.3m - 0.5m | STRAIGHT(TURN) | MODERATE | VERY LOW | 2 | LEFT |
| | UNDER 0.3m | STRAIGHT(TURN) | LOW | PAUSE | 1 | LEFT |
| 6R | OVER 2m | STRAIGHT | HIGH | HIGH | — | — |
| | 1.5m - 2m | STRAIGHT(TURN) | MODERATE | LOW | 3 | LEFT |
| | 1m - 1.5m | STRAIGHT(TURN) | MODERATE | VERY LOW | 2 | LEFT |
| | 0.5m - 1m | STRAIGHT(TURN) | LOW | PAUSE | 1 | LEFT |
| | 0.3m - 0.5m | SWIVEL TURN | VERY LOW | VERY LOW | 0 | LEFT |
| | UNDER 0.3m | BACKWARD | VERY LOW | VERY LOW | — | — |
| 6DR | OVER 0.5m | STRAIGHT | HIGH | HIGH | — | — |
| | 0.3m - 0.5m | STRAIGHT(TURN) | VERY LOW | PAUSE | 1 | LEFT |
| | UNDER 0.3m | SWIVEL TURN | VERY LOW | VERY LOW | 0 | LEFT |
| 6MR | OVER 0.5m | STRAIGHT | HIGH | HIGH | — | — |
| | 0.3m - 0.5m | STRAIGHT(TURN) | VERY LOW | PAUSE | 1 | LEFT |
| | UNDER 0.3m | SWIVEL TURN | VERY LOW | VERY LOW | 0 | LEFT |
| 6SL | OVER 0.5m | STRAIGHT | HIGH | HIGH | — | — |
| | 0.3m - 0.5m | STRAIGHT(TURN) | MODERATE | VERY LOW | 2 | RIGHT |
| | UNDER 0.3m | TURN | LOW | PAUSE | 1 | RIGHT |
| 6L | OVER 2m | STRAIGHT | HIGH | HIGH | — | — |
| | 1.5m - 2m | STRAIGHT(TURN) | MODERATE | LOW | 3 | RIGHT |
| | 1m - 1.5m | STRAIGHT(TURN) | MODERATE | VERY LOW | 2 | RIGHT |
| | 0.5m - 1m | STRAIGHT(TURN) | LOW | PAUSE | 1 | RIGHT |
| | 0.3m - 0.5m | SWIVEL TURN | VERY LOW | VERY LOW | 0 | RIGHT |
| | UNDER 0.3m | BACKWARD | VERY LOW | VERY LOW | — | — |
| 6DL | OVER 0.5m | STRAIGHT | HIGH | HIGH | — | — |
| | 0.3m - 0.5m | STRAIGHT(TURN) | VERY LOW | PAUSE | 1 | RIGHT |
| | UNDER 0.3m | SWIVEL TURN | VERY LOW | VERY LOW | 0 | RIGHT |
| 6ML | OVER 0.5m | STRAIGHT | HIGH | HIGH | — | — |
| | 0.3m - 0.5m | STRAIGHT(TURN) | VERY LOW | PAUSE | 1 | RIGHT |
| | UNDER 0.3m | SWIVEL TURN | VERY LOW | VERY LOW | 0 | RIGHT |

MOBILE ROBOT STEERING METHOD AND CONTROL DEVICE

BACKGROUND OF THE INVENTION

1. Field of the Invention

The present invention generally relates to a mobile robot steering method and a controlling device for a mobile robot and more particularly, to a method which allows the mobile robot to run throughout almost the entirety of a given area in a shorter period of time and a device for implementing the same.

2. Description of the Related Art

Mobile robots, including a cleaner robot, a mower robot, a plasterer robot, and an agricultural sprayer robot, are known which automatically run throughout a given area for accomplishment of an imposed task. For example, a cleaner robot, is disclosed in Japanese Patent Laid-open Publication No. HEI 5-46246 (hereinafter "JP '246"). The cleaner robot of JP '246 first runs about in a target room to be cleaned to map out a running or cleaning area through detection of the size and shape of the target room and the locations of obstacles in the room. Coordinates data, produced by the mapping, are then used for a mobile robot to clean the room while running in either a zigzag pattern or a spiral pattern in which the radius of circling is gradually decreased after every turn. The robot includes contact sensors and supersonic sensors for detecting walls around the robot to determine the robot's route. The robot also includes a distance meter for measuring the distance traveled in order to know the end of the circling motion. Another mobile robot, for running around throughout the whole area of a given floor, is disclosed in Japanese Patent Laid-open Publication No. HEI 5-257533 (hereinafter "JP '533").

Such conventional mobile robots, as shown in JP '246 and JP '533, are generally provided with a number of sensors. The outputs of the sensors are used for acquiring the data of an area to be traveled and determining the operations to be performed for running through. More particularly, the outputs of the sensors are constantly transferred to a central controlling unit, which in turn determines the controlling action for steering the robot at high accuracy on the basis of the sensor outputs. Driving actuators, such as motors, are controlled on the basis of these determinations.

When the central controlling unit handles the outputs of all of the sensors, the system of the central controlling unit should be sophisticated and the central controlling unit's processing speed will be lowered. Such a lower processing speed may retard and thus, take an averting action, when encountering an obstacle such as a wall. Also, time for mapping, teaching, and settings of relevant thresholds and initial values are required, for various kinds of controls and skills for the settings.

Accordingly, conventional mobile robots are so bulky in size, heavy in weight, and costly that the applications thereof will be limited. Examples of the limited applications are, for instance, as transporting robots and as cleaning robots in plants.

Not all robots have to run throughout the entirety of a target area at a higher accuracy, but some robots are allowed to run throughout the area with a considerable degree of accuracy. The routes and directions of these robots may not be critical. In some cases of a cleaning robot, for example, the area to be cleaned does not always have to be covered in its entirety, but rather some of the area can remain uncleaned. Depending on the requirements of some mower robots, the mower robots must produce highly neat traces of mowed area and the other mower robots are expected to perform a mowing operation only at a substantial level.

SUMMARY OF THE INVENTION

It is the object of the present invention to provide a mobile robot steering method and a device for the same in which a robot with a simple construction is caused to run throughout almost the entirety of a target area to be covered.

According to the present invention, a mobile robot, while detecting the boundary of an area to be covered with its sensors, performs a spiral pattern running motion which starts from any desired location in the area and which has a radius that is gradually increased. When the distance of the robot from the boundary is smaller than a preset value, the spiral pattern running motion is cancelled and a random pattern running motion is started. The random pattern running motion includes first turning from the forward direction by a predetermined angle to run away from the boundary, running straight forward, then repeating the turning motion and the straight forward running motion whenever the boundary is detected. When the turning motion has been repeated a predetermined number of times, the spiral pattern running motion is started again at a location spaced by a predetermined distance from the last turning spot or at a location to which the robot has run straight for a predetermined duration of time from the last turning location.

The number of times for repeating the turning motion, before the spiral pattern running motion, and the specific distance or time of straight running, from the last turning motion to the resuming of the spiral pattern running motion, may be determined through a series of simulations so that the duration of time, required for running throughout almost a desired percentage of the area, is minimized. The angle for the turning motion may preferably be 135 degrees with respect to the forward direction.

A controller for a mobile robot, according to the present invention, in which the direction of running is determined by the direction of rotation and the speed of rotation of both left and right wheels of the robot, comprises: either a right side obstacle sensor and a left side obstacle sensor or sensors mounted on the right front and the left front of a main body of the robot; means for generating running motion parameters, in accordance with the distances to obstacles detected by the right and left side sensor(s), which parameters are independent of each other; and means for determining the direction and speed of rotation of each of the left and right motors on the basis of the running motion parameters selected out of at least two of the generated running motion parameters by a predetermined rule of priority. The running speed of the robot may preferably be lowered in steps, in proportion to the distance detected from the obstacle.

BRIEF DESCRIPTION OF THE DRAWING FIGURES

FIGS. 6A, 6B and 6C are schematic views showing a spiral pattern running motion for the robot according to the present invention;

FIG. 13 is a run parameter table showing the relationship between run parameters and outputs of the sensors;

Figure 17A:
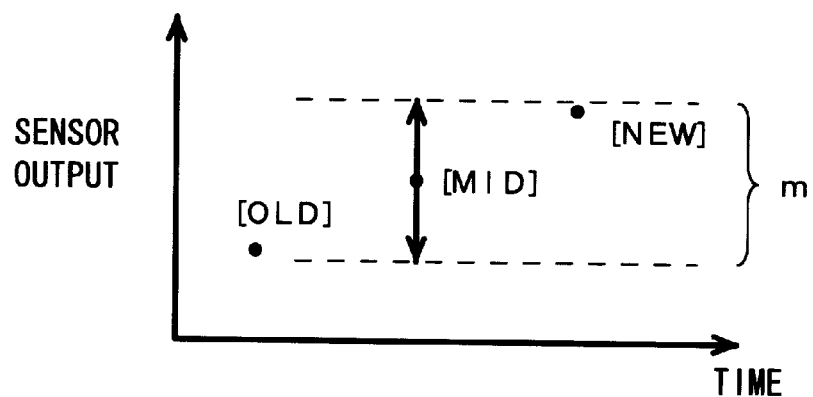
Figure 17B:
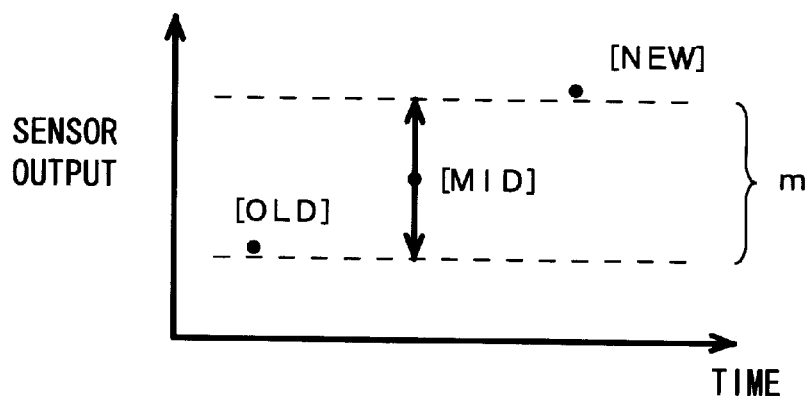
Figure 17C:
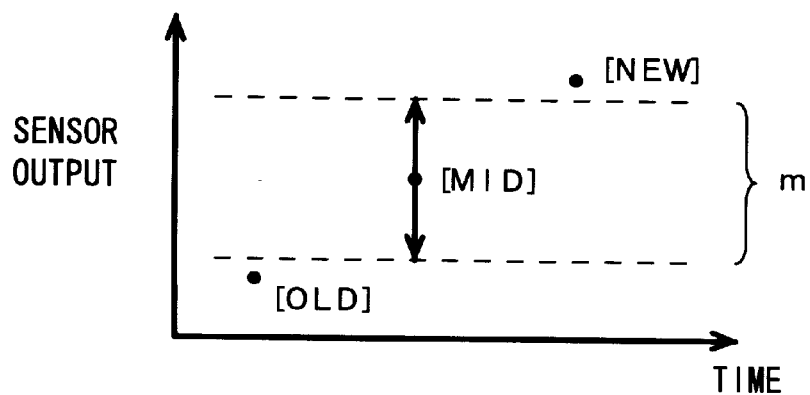

FIGS. 17A, 17B, and 17C are schematic diagrams showing control of selection of sensor signals.

DETAILED DESCRIPTION OF THE PREFERRED EMBODIMENTS

Figure 1:
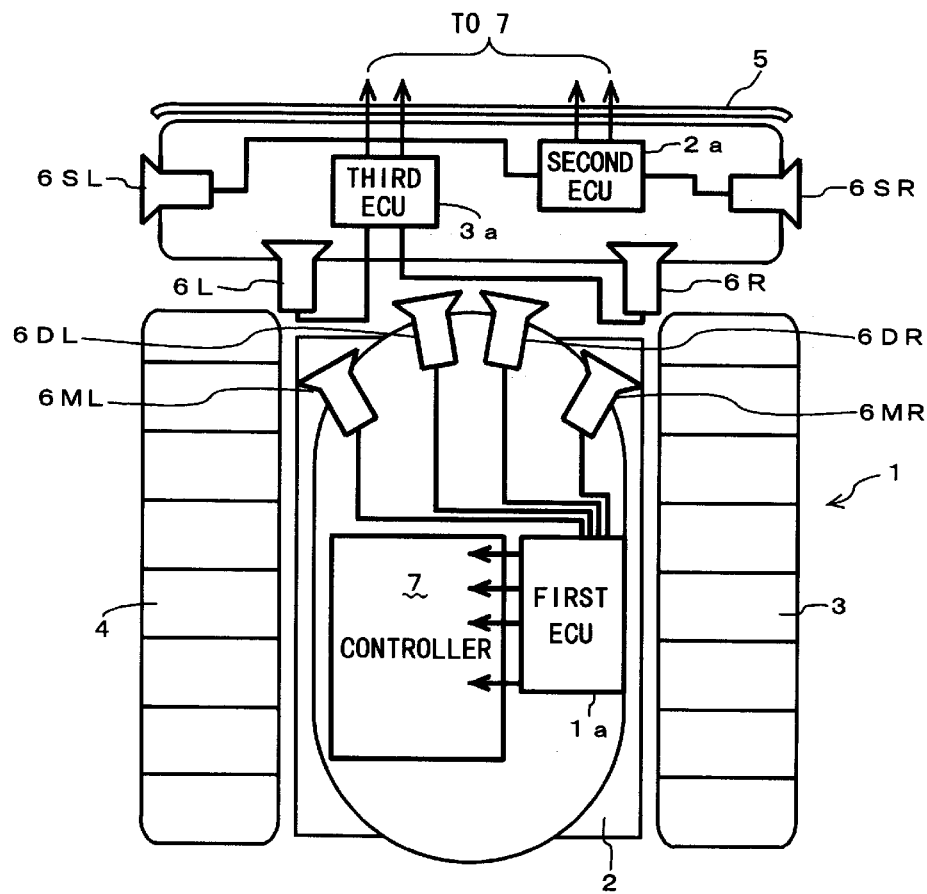
FIG. 1 is a schematic view showing a construction of a robot according to a first embodiment of the present invention.

The present invention will be described in more detail referring to the accompanying drawings. FIG. 1 is a schematic view of an outline structure of a mobile robot 1 provided with a controller according to a first embodiment of the present invention. As shown, the robot 1 operates forward running, backward running, pausing, and turning motions with a pair of caterpillar treads 3, 4 mounted on right and left sides, respectively, of the body 2 of the robot 1, and controlled therefrom. Each tread 3, 4 is joined to a driving motor (not shown). The turning motion includes: a pivot turn, wherein one of the caterpillar treads 3, 4 is driven, while the other of the caterpillar treads 3, 4 is halted; and a swivel turn, wherein each of the two caterpillar treads 3, 4 are driven away from each other in opposite directions. The body 2 has a bumper 5 mounted to the front thereof. The bumper 5 is accompanied by a contact sensor (now shown) which senses a pressure upon touching an obstacle and thus, detects the presence of the obstacle.

The robot 1 also includes eight supersonic sensors for detecting an obstacle without contact, as follows: sensors 6R and 6L mounted on the front right and left side, respectively; sensors 6ML and 6MR mounted on the left and right front ends, respectively; sensors 6DL and 6DR mounted on the front left and right lower side, respectively; and sensors 6SL and 6SR mounted on the left and right sides, respectively, of the robot 1. Those sensors are preferably of a supersonic type, but may be of any other type, such as optical sensors. The sensors 6R, 6SR, 6MR, and 6DR detect obstacles on the right side of the body 2, while the sensors 6L, 6SL, 6ML, and 6DL detect obstacles on the left side of the body 2. The detection signals from the right and left side sensors produce the parameters for rotation of the intra-side and the opposite side treads 3, 4, respectively.

For simplicity of description, the eight sensors 6R, 6L, 6MR, 6ML, 6SR, 6SL, 6DR, and 6DL will be simply called a supersonic sensor group 6 when all are inclusively referred to. The sensors 6DR, 6DL, 6MR, and 6ML are connected to a first electronic control unit or ECU 1a, the sensors 6SR and 6SL are connected to a second electronic control unit or ECU 2a, and the sensors 6R and 6L are connected to a third electronic control unit or ECU 3a, respectively. The ECUs all are connected to the controller 7, which will be described later, and the ECU's are all arranged to control the driver circuit for the sensor group 6 and the inputting and outputting of the detection signals from the sensor group 6.

In addition to the above-mentioned obstacle sensors, additional sensors (not shown) are provided for detecting the number of revolutions of the treads 3, 4. The revolution sensors may be implemented, for example, by encoders directly linked to the two driving motors. A pulse output of each encoder is used as indicative of the number of revolutions.

Figure 2:
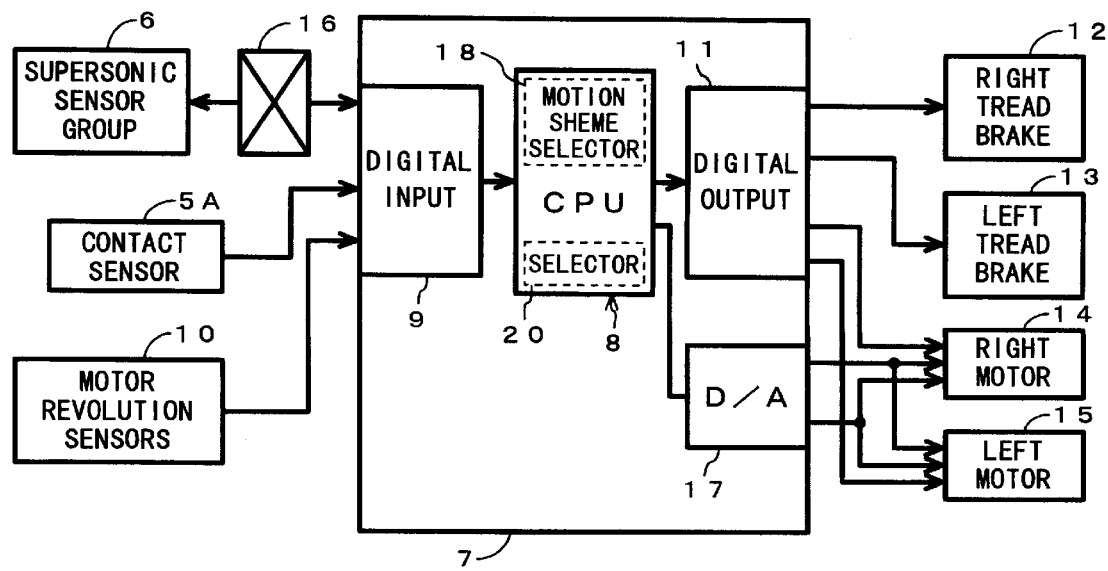
FIG. 2 is a block diagram of a hardware structure of a controller according to the first embodiment of the present invention.

A hardware arrangement of the controller 7 in the first embodiment will now be described referring to the block diagram of FIG. 2. The controller 7 includes a central processing unit or CPU 8 and a digital input 9, which is connected to the supersonic sensor group 6, via a supersonic sensor driver circuit 16 (including the first through the third ECUs 1a, 2a and 3a), for controlling the input and output of sensor signals. Also, the digital input 9 is connected to a contact sensor 5A, mounted on the bumper 5, and to motor revolution sensors (encoders) 10 for the motors driving the left and right treads 3, 4, as well as the supersonic sensor group 6. Accordingly, the detection signals of the supersonic sensor group 6, the contact sensor 5A, and the revolution sensors 10 are transmitted via the digital input 9 to the CPU 8.

The CPU 8 is connected via a digital output 11 to a right tread (electromagnetic) brake 12, a left tread (electromagnetic) brake 13, a right tread motor 14 (referred to as a right motor), and a left tread motor 15 (referred to as a left motor). Instruction signals, determined through the respective processes in the CPU 8, are thus supplied via the digital output 11 to the right tread brake 12, the left tread brake 13, the right motor 14, and the left motor 15. The right motor 14 and the left motor 15 are fed with the instruction signals for steering. Also, the instruction signals for motor revolution speed from the CPU 8 are transferred via a digital-to-analog or D/A converter 17 to the right motor 14 and the left motor 15.

In this arrangement, the CPU 8 is responsive to the inputs from the supersonic sensor group 6 and the contact sensor SA (referred all-inclusively to as "sensors" hereinafter) for determining the action of a drive system including the right motor 14 and the left motor 15. The forward running, backward running, pausing, and turning motions of the robot are independently controlled, as the functions of their corresponding modules, by the CPU 8. While the processes of inputs from the sensors and the generation of motion schemes are being conducted constantly, only the forward running motion is enabled in a normal mode with the swivel turn, pausing, and backward running motions maintained in a sleep state. The turning motions, except for the swivel-turns, are controlled by a forward running control module.

Figure 3:
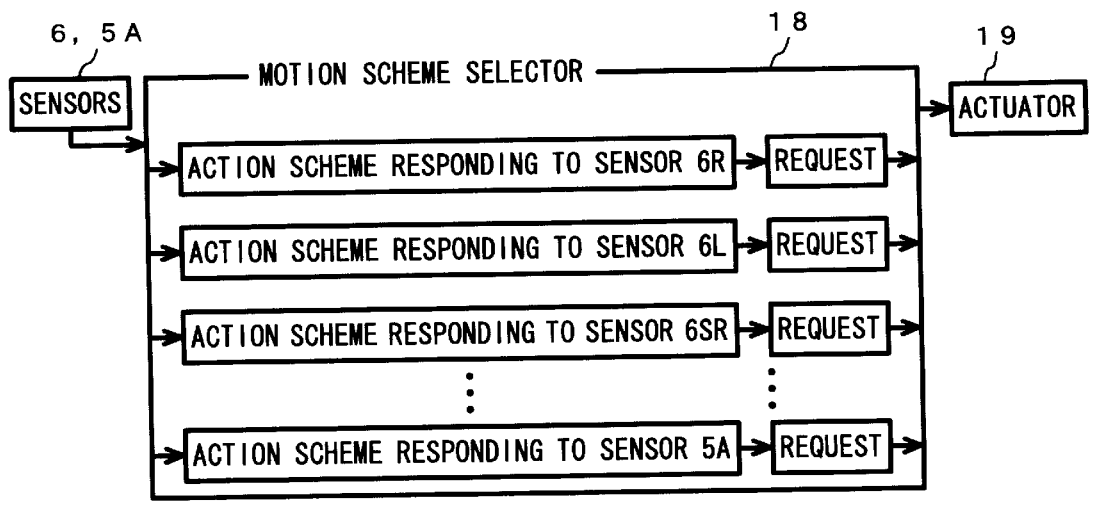
FIG. 3 is a schematic diagram showing the process system for selecting a motion scheme.

The CPU 8 includes a motion scheme selector 18 for assigning the robot to do one of a number of predetermined motions in conditioned response to the inputs from the sensor group 6. FIG. 3 is a schematic view showing a system of process actions in the motion scheme selector 18. As shown, the motion scheme selector 18 has a multi-stage arrangement connected to the sensors 6 and 5A for generating action schemes and their requests in response to the outputs of the sensors. The motion scheme selector 18 selects one of the requests as its instruction signal. The instruction signal thus selected is fed to the drive system 19 (an actuator) for controlling the right tread brake 12, the left tread brake 13, the right motor 14, the left motor 15 and others. As mentioned above, the instruction signals of the action scheme generated in response to the outputs of the sensors are accumulated and used in combination to demonstrate the comprehensive action of the robot.

Figure 4:
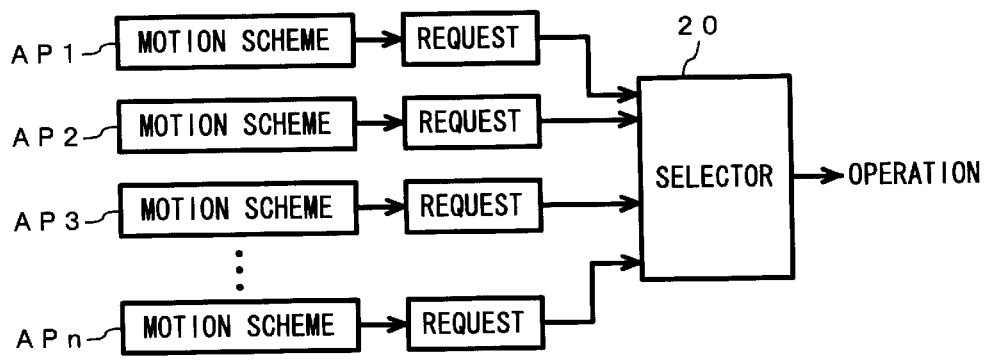
FIG. 4 is a block diagram showing the selection of the motion scheme.

The first embodiment is designed for not directly performing the action schemes generated in response to the outputs of the sensors, but instead for ranking the action schemes by their priority under predetermined rules and then, performing a sequence of the action schemes starting from the one having the highest priority. FIG. 4 is a block diagram showing a process of motion detection in the first embodiment. When the action schemes AP1, AP2, . . . APn and their requests have been generated, a highest priority scheme, which is to prevent a collision against a wall, is selected by a selector 20 from the action schemes AP1, AP2, . . . Apn. The highest priority action scheme in the first embodiment is to run backward. The second highest priority is to swivel at the site and the pivot turn, sharp turn, and slow turn follow in the order listed. The pivot turn, sharp turn, and slow turn are categorized as part of the forward running motion and are distinguished from each other by the difference of the speed between the left and right treads 3, 4.

For example, when the action scheme is selected for turning slowly at a moderate speed to the right with an angle θ, the scheme driving the right tread 3 at V1 rpm and the left tread 4 at V2 rpm, wherein V2>V1, is executed. The priority for each action scheme is determined in response to the outputs of the supersonic sensor group 6 and hence, a stop control is excluded on the basis of the obstacle detection output of the contact sensor.

It should be noted that in a backward running of the motion schemes, the robot runs backwards for a predetermined duration of time and in general, the backward running is promptly shifted to the swivel turn. During a normal forward running, the two motors 14, 15 receive the same instruction of revolutions per minute or rpm. It is preferable, for improving the accuracy of the forward running, to compensate the instructions for the treads 3, 4, on the basis of the output pulse signals from the revolution sensors 10, so that the left and right motors 14, 15 rotate at the same speed. The pausing motion is conducted by changing the revolution speed to zero and actuating both the right and left tread brakes 12, 13. If necessary, regenerative braking may be used in the pausing motion.

Figure 5A:
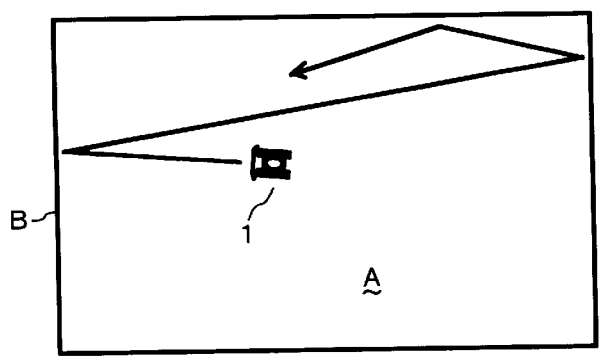
FIGS. 5A and 5B are schematic views showing a basic pattern running motion for the robot according to the present invention.
Figure 5B:
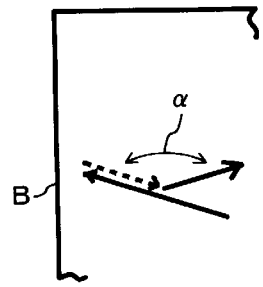

Patterns of running of the robot according to the present invention, which are combinations of the above motions, will now be explained. The description starts with a random running which is a basic running pattern of the robot 1. In the random running pattern, the robot 1 usually runs straight forward in an area A defined by boundaries or walls B as shown in FIGS. 5A and 5B. When the robot 2 reaches at a set distance from one of the walls B, it pauses and turns through a predetermined angle (or may be moved backward a distance before turning). Then, the robot 1 starts again running in a straight line towards the other wall B. The angle α of turning (FIG. 5B) in the proximity of the wall B may be determined at random selection in each turning motion.

The inventors of the present invention have found through a series of simulations that there is an optimum turning angle α for allowing the robot 1 to run, not into the regions where the robot 1 has already passed, but across different regions to cover more portions of the area A. The optimum angle α is 135 degrees. The random running pattern with the turning angle α of 135 degrees will hereinafter be referred to as a fine-tuning random running pattern.

It has also been found by the inventors of the present invention that a combination of the fine-tuning random running pattern and a spiral pattern running motion further improves the efficiency of working operation, when the random running (preferably, the fine-tuning random running with 135-degree turning) has been repeated a predetermined number of times, and the running is switched into a spiral motion. Such a combination of the random running and the spiral running will hereinafter be referred to as spiral/random running pattern.

The spiral/random running pattern is now explained in more detail. Referring to FIG. 6A, the robot 1 is first placed at an appropriate spot in the area A. It is assumed that the area A has a rectangular shape defined by four walls B. The initial placing of the robot 1 is arbitrary. The robot 1 then starts running in a spiral pattern as shown in FIG. 6A. In the spiral running, the radius of circling is gradually increased in turns. This motion is controlled by a decision which is different from those for the forward running, the swivel turning, and backward running and will be explained later in more detail referring to FIG. 14. In brief, the speeds of the two treads 3, 4 or the revolution speeds of the two motors 14, 15 are calculated so that there are no gaps between any two adjacent circling tracks of the robot 1. The speeds of the two treads 3, 4 or the revolution speeds of the two motors 14, 15 are then updated for increasing the radius of circling in turns. As the spiral of the trace is enlarged, the robot 1 comes close to one of the walls B and its arrival at substantially a predetermined distance from the wall B is detected with the supersonic sensor group 6. This allows the robot 1 to stop the spiral running and start a (preferably fine-tuning) random pattern running for traveling to a location where another spiral running is to be commenced (FIG. 6B). The shaded areas in FIGS. 6B and 6C represent the trace of the robot 1 or the regions which have been covered by the running of the robot 1.

The intermediate action from the cancelling of the current spiral running and to the starting of another spiral running is as follows. When the robot 1 comes close to the wall B and any supersonic sensor 6 detects that the robot 1 is at about a predetermined distance from the wall B, the turning motion, explained with reference to FIGS. 5A and 5B, starts. For example, when the current distance of the robot 1 from the wall B is smaller than the predetermined distance at the moment of the detection of the wall B, the robot 1 immediately stops its forward running, moves backward a predetermined distance if required, and performs a swivel turn through 135 degrees (or any other desired angle) before resuming a forward running to move away from the wall B. Should the current distance of the robot 1 from the wall B at the time of detection be greater than the predetermined distance, the robot 1 may be turned sharply with a smaller angle to steer clear of the wall B.

Similarly, when the robot 1 has turned away from the wall B, run forward, and arrived close to another wall B, its running direction will be changed by conducting the backward running and the swivel, pivot or simple turning. After the turning at the wall B is repeated a predetermined number of times N, the robot 1 runs away from the wall B where the latest turning motion has been performed for a specific duration of time T (or by a specific distance D) and the robot 1 stops its forward running motion. Then, the robot 1 again starts another spiral pattern running motion (FIG. 6C) and the above-mentioned actions are repeated thereafter. For simplicity of description, the distance D from the latest wall B is substituted by the time T. A designer or an operator of the robot 1 may, however, select either the distance D or the time T as a parameter for use in the controlling operation.

Figure 7A:
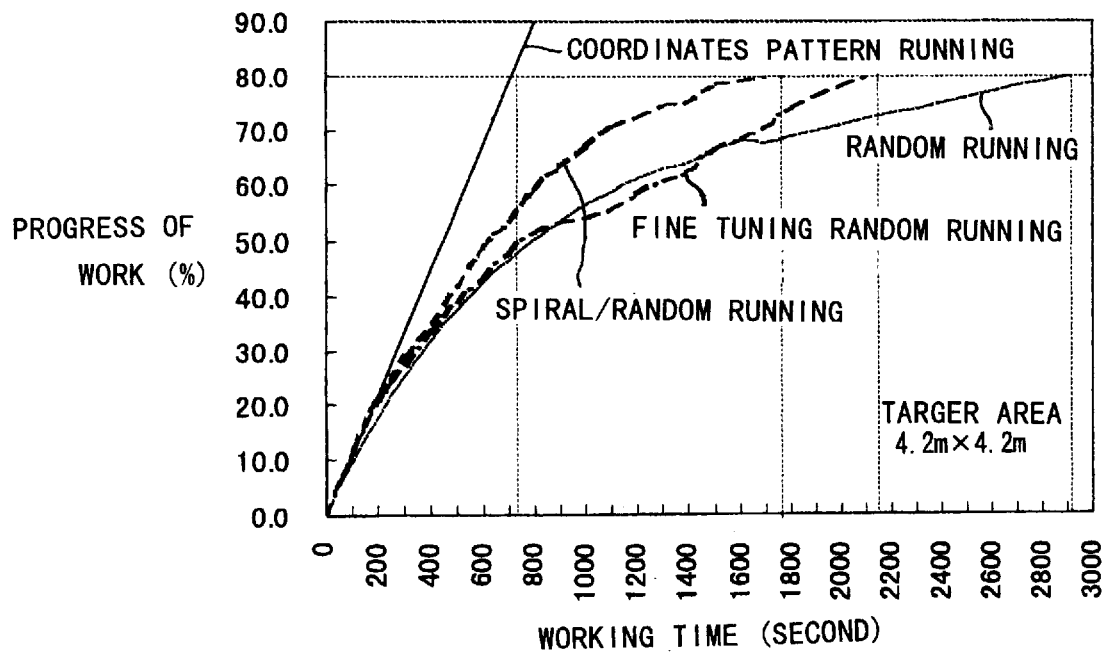
FIGS. 7A and 7B are diagrams of a result of simulation showing the relationship between time and progress of work using various parameters of the running pattern motion.
Figure 7B:
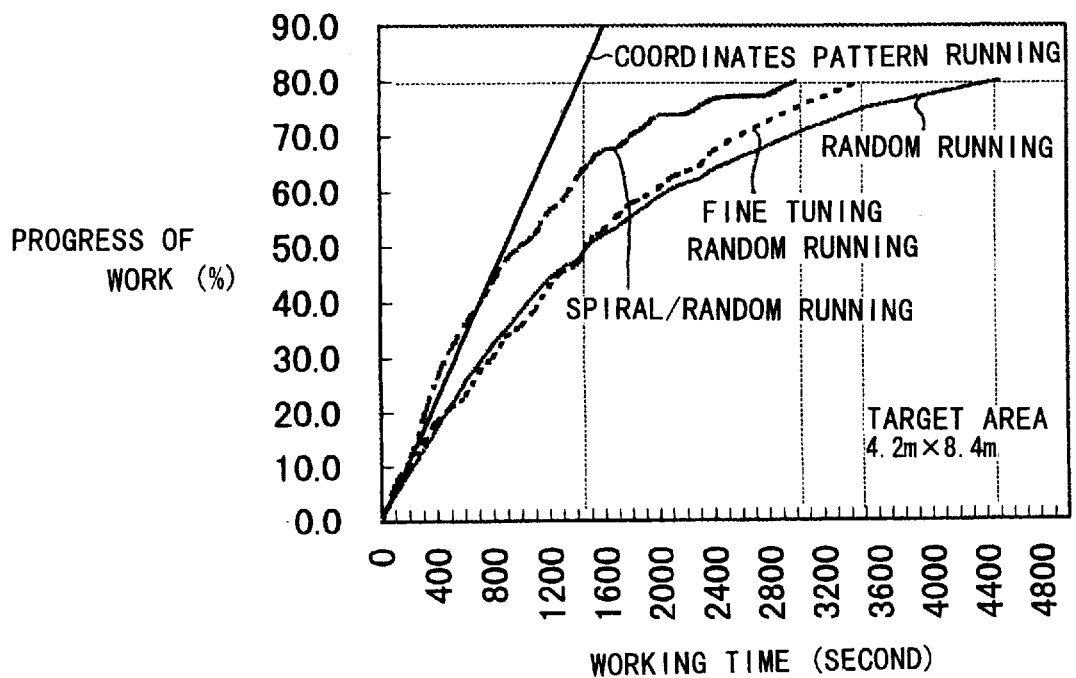

FIGS. 7A and 7B are graphs showing the relationship between a working time and a progress of the work or a coverage of the target area conducted by a robot 1 in the simulations of the present invention. The vertical axis represents a rate (%) of the target area covered by running of the robot 1 and the horizontal axis is a working time from the start. It is now noted that the size and shape of the robot 1 is equivalent to a circle of 20 cm in diameter and running speed of the robot 1 is 13 cm/second. The target area is a square having dimensions of 4.2 m by 4.2 m in FIG. 7A and is a rectangle having dimensions of 4.2 m by 8.4 m in FIG. 7B.

In FIGS. 7A and 7B, a coordinates pattern running is defined as a running motion along a path predetermined on a coordinate plane so that the robot 1 can cover the entirety of the target area, in which the area coverage rate is increased linearly proportional to an elapsed time. In comparison, the other pattern running motions, including the spiral/random pattern running, exhibit an attenuating increment of the area coverage and may find it very difficult to cover the entirety of the area. Assuming that the area coverage of 80% is acceptable, three of the pattern running motions, except for the coordinates pattern running motion, are compared in the efficiency of 80% coverage per a spent time. It is apparent that the spiral/random pattern running motion covers 80% of the target area in the shortest time.

The number of turning times N and the forward running time T (or the distance D) must be previously set to desired values. If the number of times N is too small, the spiral running to be resumed is too close to the preceding spiral running area and hence, an overlap region increases and the work efficiency declines. On the contrary, when N is too large, the time T (or the distance D) of forward running is increased too much and thus, the working efficiency is lowered. If the time T is excessively short or long, the spiral running resumes near the latest wall B and may quickly come close to another wall B so that the working efficiency declines.

Figure 8A:
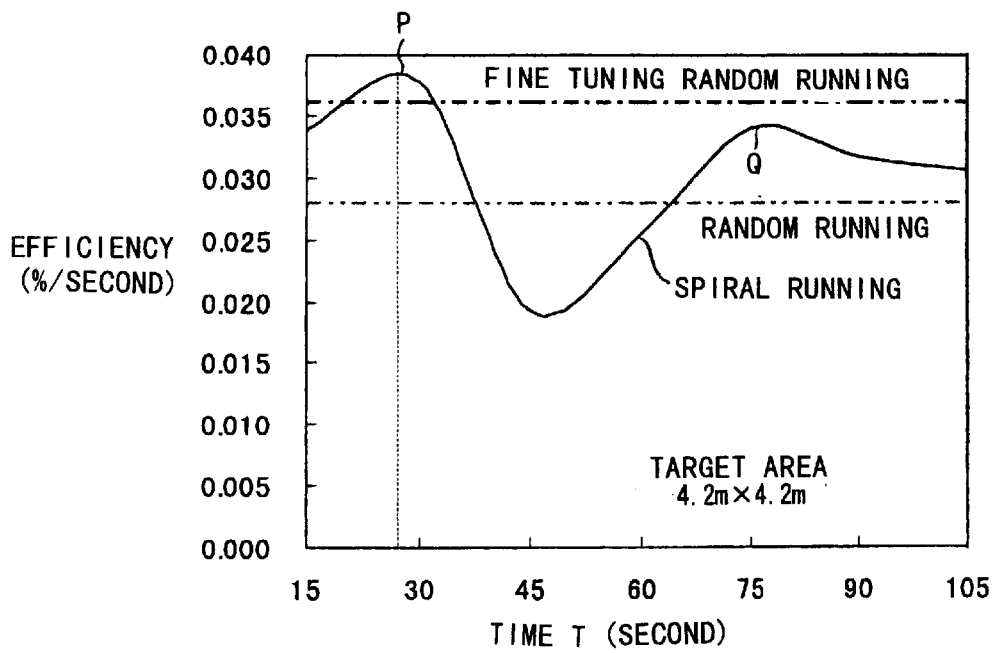
FIGS. 8A and 8B are diagrams of a result of simulation showing the relationship between working efficiency and amount of running time T.
Figure 8B:
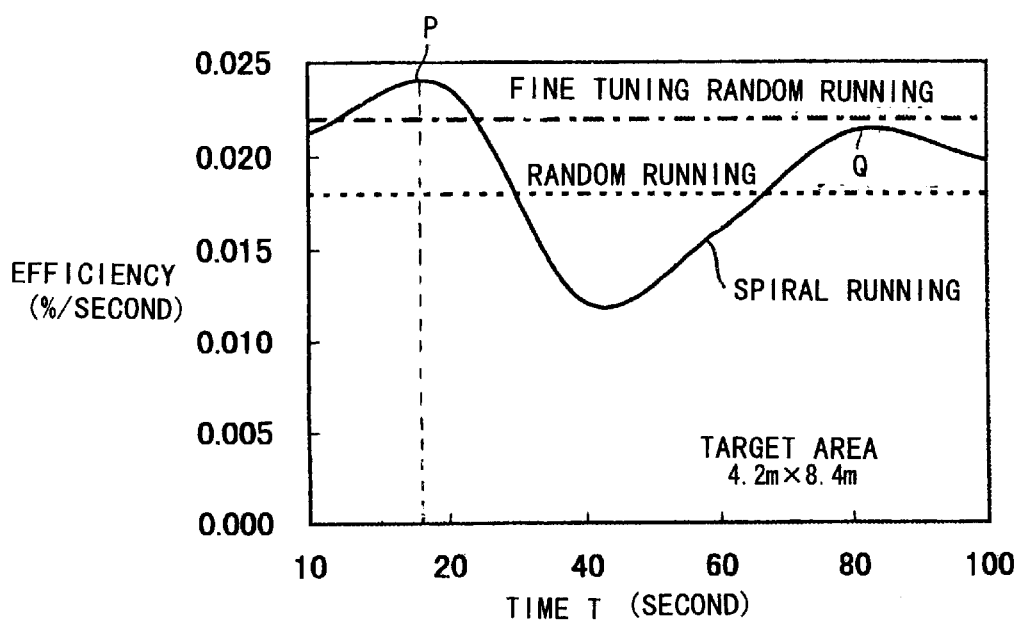

Optimum lengths of time T are found through experimental simulations, as shown in FIGS. 8A and 8B. The vertical axis represents the working efficiency and the horizontal axis is the time T (seconds) after the swivel turning motion. The working efficiency is defined as a coverage (%) of the target area per second and is calculated on the basis of the time spent for covering 80% of the target area (FIGS. 7A and 7B).

In those simulations, like the previous experiments, the area to be covered by the robot 1 is a 4.2 m×4.2 m square, as in FIG. 8A, and a 4.2 m×8.4 m rectangle, as in FIG. 8B. It is also noted that the size and shape of the robot 1 is a circle of 20 cm in diameter and the running speed of the robot 1 is 13 cm/second. As is apparent from FIGS. 8A and 8B, there are two (peak) points P and Q where the working efficiency is extreme for the time T. It is hence desired that the time T is determined at the point P where the working efficiency is at a maximum in a shorter time T. For the purpose of comparison, levels of the working efficiency in the random pattern and fine-tuning random pattern running motions are also shown.

Figure 9A:
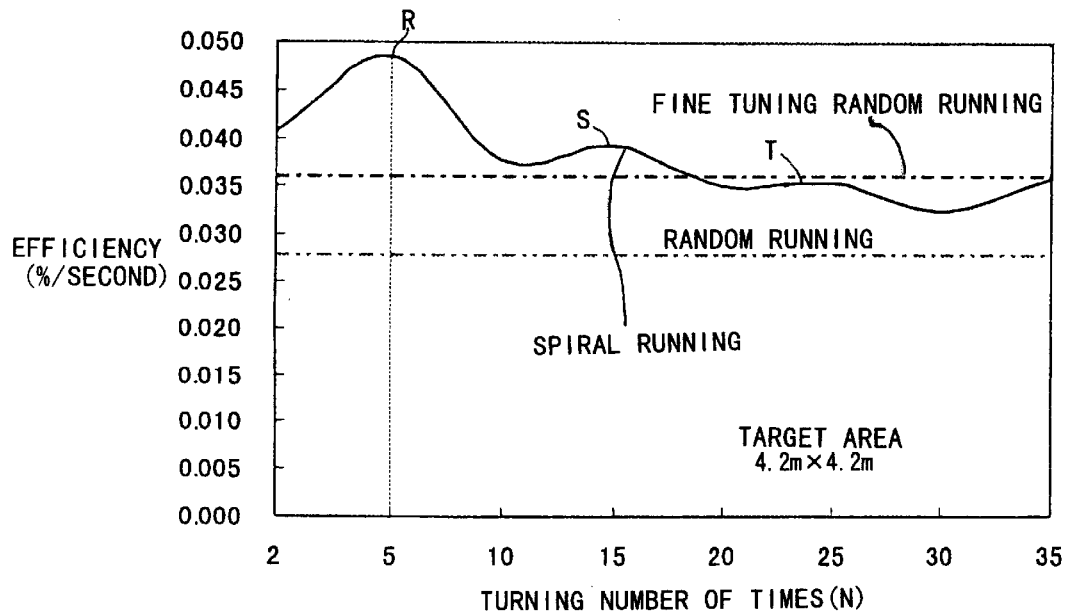
FIGS. 9A and 9B are diagrams of a result of simulation showing the relationship between working efficiency and the number of times of turning or revolving motions N.
Figure 9B:
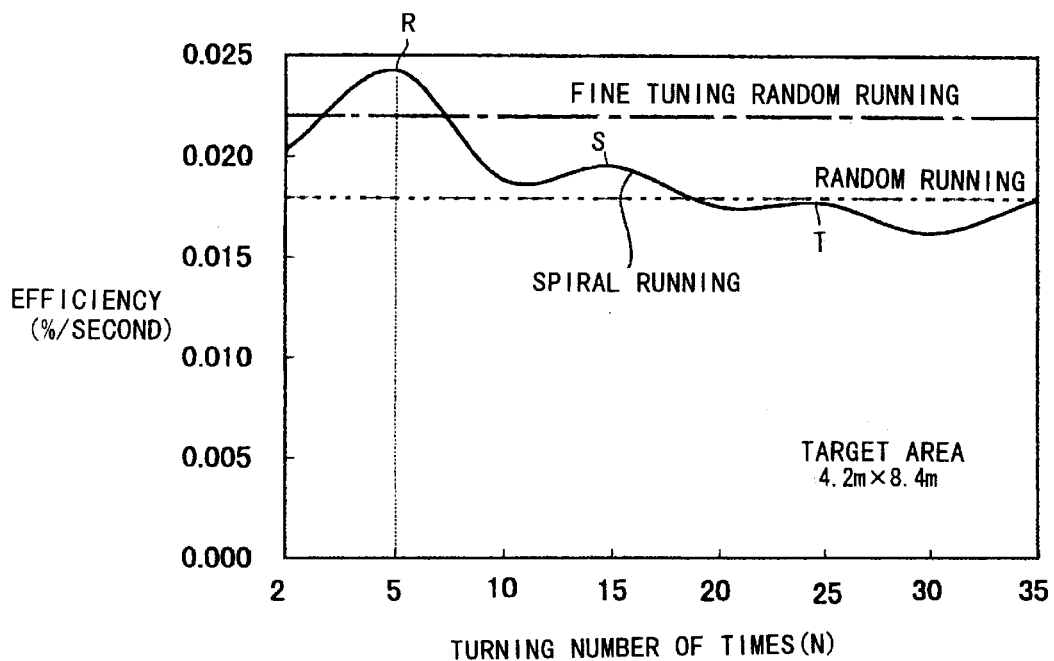

FIGS. 9A and 9B illustrate optimums of the number of turning times N found through the simulations. The vertical axis represents the working efficiency and the horizontal axis is the number of turning times N. The size of a target area, the projected area of the robot 1, and the running speed of the robot 1 are identical to those shown in FIGS. 8A and 8B. As is apparent, (peak) optimum points R, S, T . . . of the working efficiency are specified as the number of turning times N is varied. When the number of turning times N is five, the working efficiency is maximum in each case where the target area is large or small. For comparison, levels of the working efficiency in the fine-tuning random pattern and random pattern running are shown.

In the simulations for determining the optimum of the time T and the number of turning times N, it has been found that there is no interference with each other between the time T and the number of turning times N. This permits the determination of the optimum of either of the time T or the number of turning times N to be followed by the determination of the optimum of the other of the time T or the number of turning times N. In the first embodiment, first the optimum of the time T is decided and then, the optimum of the number of turning times N is decided.

Figure 10:
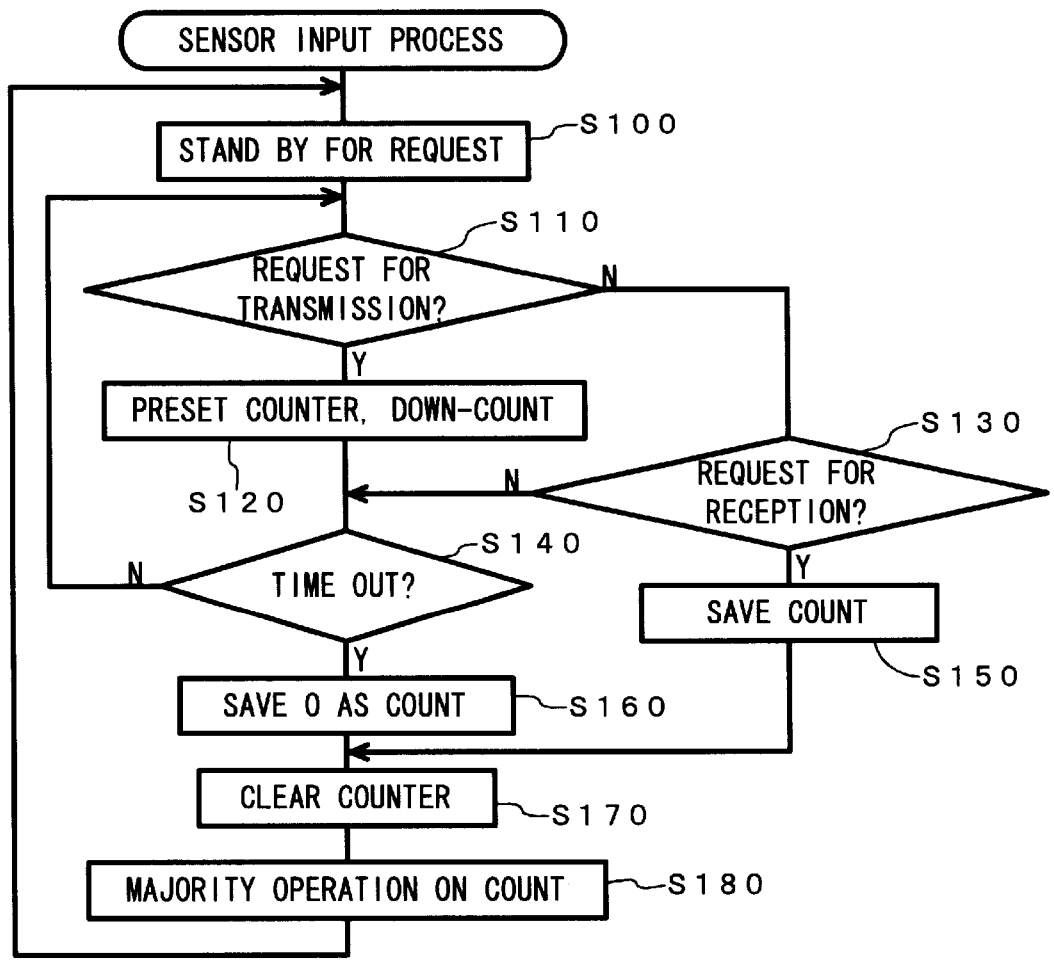
FIG. 10 is a flowchart of processing inputs from supersonic sensors.

The action of the controller 7 will now be explained referring to the flowcharts. The explanation starts with processing inputs from the supersonic sensor group 6. As shown in FIG. 10, Step S100 stands by to receive a request from the supersonic sensor group 6 (or the supersonic sensor driver circuit 16). When the request is received, the procedure goes to Step S110 where it is determined whether or not the request indicates transmission of supersonic waves or more specifically, whether the CPU 8 is informed of transmission of supersonic waves from the supersonic sensor 6. When the request demands the transmission of supersonic waves, the procedure moves to Step S120 for presetting the counter with a predetermined value and starting countdown of the counter. The predetermined value, which is preset, is indicative of a predicted longest duration of time in which reflected waves will be received by the supersonic sensor 6.

It is then determined at Step S130 whether or not a request of signal reception is issued, or more specifically, whether the supersonic sensor 6 receives the reflected waves. If the request of signal receipt is not issued, the procedure goes to Step S140 where whether or not the time preset has expired is checked, or more specifically, whether the counter has counted down to zero. When the preset time has not expired, the waiting for the request of the signal receipt continues until the time has expired. When it is judged at Step S130 that the request of signal receipt has been released, the procedure moves to Step S150 for saving a current count of the counter value. When the count has been saved, the counter is cleared at Step S170. If the request of signal receipt is not received before the time has expired, the current count is saved as 0 at Step S160 and the counter is cleared at Step S170. At Step S180, majority operation may preferably be carried out for improving the reliability of the count saved at Step S150. The majority operation will be explained later in more detail referring to FIG. 17. The count saved during the processing of inputs from the supersonic sensors 6 is referred to as a distance count hereinafter.

Figure 11:
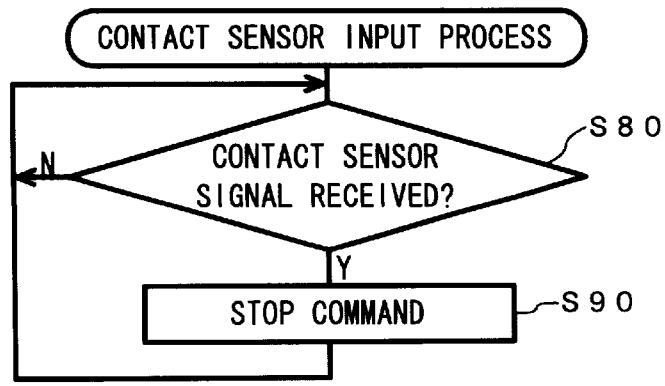
FIG. 11 is a flowchart of processing inputs from contact sensors.

FIG. 11 is a flowchart of processing an input from the contact sensor 5A. When it is determined at Step S80 that the detection signal from the contact sensor 5A is received, the procedure goes to Step S90 where a command for stopping the running of the robot 1, or an instruction for shifting the revolution speeds of the two motors 14, 15 to zero, is delivered and simultaneously, the right and left brakes 12, 13 are actuated. The processing of inputs from the contact sensor 5A may be executed by the timer interruption at intervals of, for example, 10 milliseconds.

The controlling operation in response to the output signals of their respective sensors is explained. Referring to a general flowchart of FIG. 12, an instruction for starting the spiral running is given at Step S1. The controlling of the spiral running will be described later in more detail referring to FIG. 14. At Step S2, the distance count, which is a result of the processing of inputs of the supersonic sensors, is requested. Then, the processing of an input from the contact sensor is carried out at Step S3 (actually, it is done by the timer interruption, as mentioned above).

This is followed by Step S4 where it is determined whether the spiral running is under way or not. In an initial stage, since the spiral running is enabled by the spiral motion starting instruction (Step S1), Step S4 judges yes. When yes is judged at Step S4, the procedure advances to Step S5 where it is determined whether or not the spiral running is to be continued or not. Step S5 for determining the continuation of the spiral running incorporates judging, on the basis of the distance count saved in the supersonic sensor inputs processing, whether or not the robot 1 is close to the predetermined distance from any wall B, or whether or not the current spiral running has to be cancelled and moved to a different location where another spiral running is started.

In this embodiment, the current spiral running is cancelled when the robot 1 reaches 30 cm or less from the wall B. At Step S6, it is decided from the result of Step S5 whether or not the spiral running is cancelled. If not, the procedure returns to Step S2.

When the decision is affirmative at Step S6, the procedure goes to Step S8 for selecting the succeeding motion. After the spiral running has been cancelled, the backward running commonly follows. At that time, the robot 1 is so close to the wall B that its normal turning may easily result in collision with the wall B. Therefore, the backward running is generally selected first, then it is commonly followed by the swivel turn and the (straight) forward running.

When the backward running is selected at Step S8, the procedure moves to Step S9 where it is determined whether or not the current motion is backward. The motion is not backward immediately after the spiral running is cancelled and then, it is judged not. Step S10 follows where the pausing motion of the robot is called for a moment (in 20 to 30 ms) and the procedure goes to Step S11. If the current motion is judged to be backward at Step S9, the procedure skips Step S10 and moves to Step S11. The backward running process is requested to be commenced at Step S11 as will be explained later in more detail. When the backward running is commenced in response to the request, the backward running takes over the spiral running and "no" is established at Step S4 before the procedure goes to Step S7. Since the spiral running has been cancelled, the decision at Step S7 is used at Step S8 for selection of the succeeding motion.

At Step S7, the succeeding motion is selected or decided according to the distance count produced by the supersonic sensor group 6 (a succeeding motion determination). The succeeding motion determination incorporates selection of the succeeding motion for the robot through examining run parameters listed in the run parameter table of FIG. 13. Selections of the parameters in the table of FIG. 13 are designated corresponding to the detection outputs of the sensors which indicate the distances to the wall and are transmitted for starting a desired motion. The parameters include the speeds of the two treads, the degree of turning, and the direction of turning.

The speed of each tread of the robot 1 is classified into four levels: very low speed (0.5 km/h), low speed (1.0 km/h), moderate speed (2 km/h), and high speed (3 km/h). The turning degree is classified into four levels: slow turn (through 30 degrees, Level 3), sharp turn (through 60 degrees, Level 2), pivot turn (turn on pivot with one tread held, Level 1), and swivel turn (two treads turned in opposite directions each other, Level 0). The turning motion is also categorized into the left turn and right turn.

When the wall is detected by the supersonic sensors 6SR, 6R, 6DR, and 6MR mounted on the right half of the robot 1, a left turn is selected. When the wall is detected by the supersonic sensors 6SL, 6L, 6DL, and 6ML mounted on the left half of the robot 1, a right turn is selected.

The speed parameter for each tread of the robot 1 is categorized in two categories, as follows: speed of the sensor-side or intra-side tread and speed of the opposite-side or other tread. For instance, two parameters of the tread speed for the (right) motor of the right tread and the (left) motor of the opposite or left tread are provided on the basis of the detection output of the sensor 6R on the right side. Since a number of the parameters are usually generated corresponding to the detection outputs of all the sensors 6, their selection to be actually used is governed by a predetermined rule. The table of FIG. 13 has a general rule, according to the present invention, which gives the priority to the slower speeds with an exception in that the very low speed is selected when the "pause" parameters are assigned to both of the motors 14, 15.

For example, when the distance count of the right front sensor 6R exhibits the distance of substantially 0.5 m to 1 m, the "low speed" parameter is assigned to the intra-side or right motor and the "pause" parameter is assigned to the opposite-side or left motor. In addition, the control to be activated is a turning motion in which the turning level parameter is "1" for the pivot turn and the turning direction parameter is "left". When the distance count of the left front sensor 6L shows the distance of 1 m to 1.5 m at the same time, the parameters of "moderate speed" is given for the intra-side or left motor, "very low speed" is given for the opposite-side or right motor, "turning" is given for the control to be activated, "2" is given to the turning level, and "right" is given to the turning direction.

Those parameters are then reviewed for adopting a slower speed. As a result, the "very low" parameter is given to the right motor, while the "pause" parameter is given to the left motor. Hence, the robot 1 is caused to turn on the pivot to the left at the very low speed.

As another example, the distance of 1.5 m to 2 m from the distance count of the right sensor 6R defines the "moderate speed" parameter for the intra-side or right motor and the "low speed" parameters for the opposite or left motor. Similarly, the distance of 1.5 m to 2 m from the distance count of the left sensor 6L defines the "moderate speed" parameter for the left motor and the "low speed" parameters for the right motor. After reviewing those parameters, the "low speed" parameter is assigned to both the right and left motors thus allowing the robot 1 to run straight forward at the low speed.

As a further example, while the robot 1 runs straight forward to meet the wall B at a right angle, the detection outputs of the two sensors 6L and 6R are always the same. This causes the robot 1 to slow down its running speed as it comes close to the wall, stop the running at least, then perform the backward motion and the swivel turn, and finally, run away from the wall B.

Return to FIG. 12, after the swivel turn is selected at Step S8 from a result of the succeeding motion determination at Step S7, the procedure goes to Step S12. It is determined at Step S12 whether or not the swivel turn is under way. In the beginning, it is judged that the swivel turn is underway and the procedure advances to Step S13, for instance, pausing (for about 20 to 30 ms). Then, an instruction for starting the swivel turn is given at Step S14. In succeeding cycles of the procedure, when it is judged that the swivel turn is under way at Step S12, the procedure goes to Step S15 for starting an escape control mode. If the robot 1 moves into a corner of the working area, the robot may find it difficult to escape from the corner with only a common combination of the backward running motion and the swivel turn. In that case, the escape control mode is selected in the course of the swivel turn. The escape control mode is not closely related to the present invention and will not be explained in more detail. The teaching on the escape control in the specification of Japanese Patent Application No. HEI 9-42879 is referred to and is hereby incorporated into this specification by reference.

When the forward running motion is selected at Step S8 after the swivel turn through a specific angle (e.g. of 135 degrees), the procedure goes to Step S16 and Step S17 for instant pausing (for about 20 to 30 ms), Step S18 for prevention of hunting, and Step S19 for issuing an instruction of starting the forward running motion. In response to the instruction of starting the forward running motion, the robot 1 runs straight forward and when the robot comes close to the predetermined distance from another wall, the robot's succeeding motion is determined from the distance count of the sensors. The prevention of hunting is not closely related to the present invention and will not be explained in more detail. The teaching on the hunting prevention in the specification of Japanese Patent Application No. HEI 9-42878 is referred to and is hereby incorporated by reference into this specification.

Figure 12:
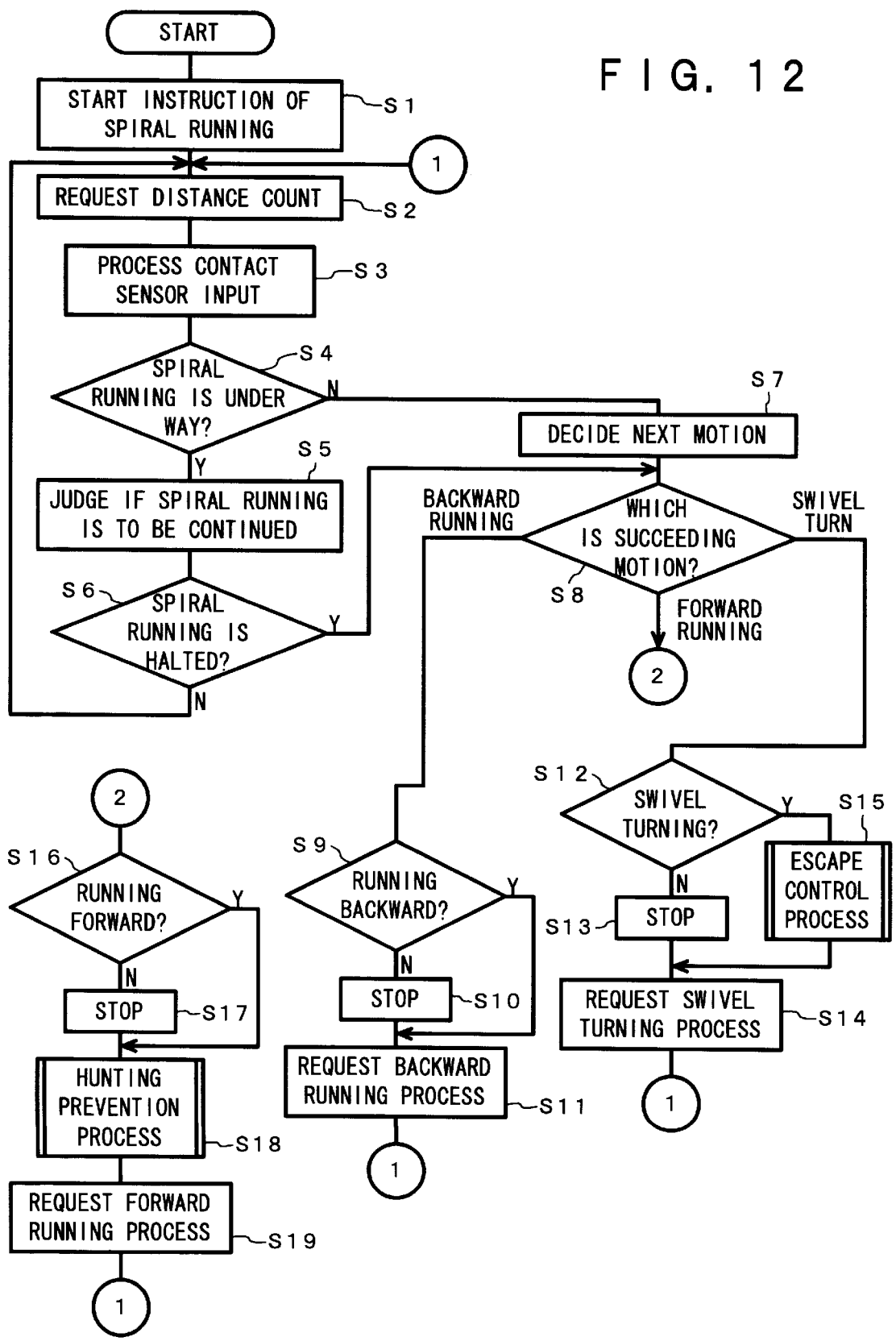
FIG. 12 is a flowchart showing motion selection or determination in the spiral pattern running motion.

The operation of the control modules in response to the detection outputs of the sensors will now be explained. The spiral running of the robot 1 is commenced when the robot begins to run for working operation as described above with reference to FIG. 12, and when, as mentioned previously with FIGS. 6A to 6C, the time T has elapsed after the last of the number N times of the swivel turnings conducted during the random running in which the robot 1 changes its running direction upon detecting the wall. In the beginning of a working operation, the spiral running process is started as commanded by the operator at Step S1 (FIG. 12). On the way, the commencement of the spiral running is requested by an instruction produced in a swivel turning process module (at Step S33 in FIG. 15) after the swivel turn has been carried out number N of times. The following description concerns the spiral running started by the instruction to commence which is produced in the swivel turning process module.

Figure 14:
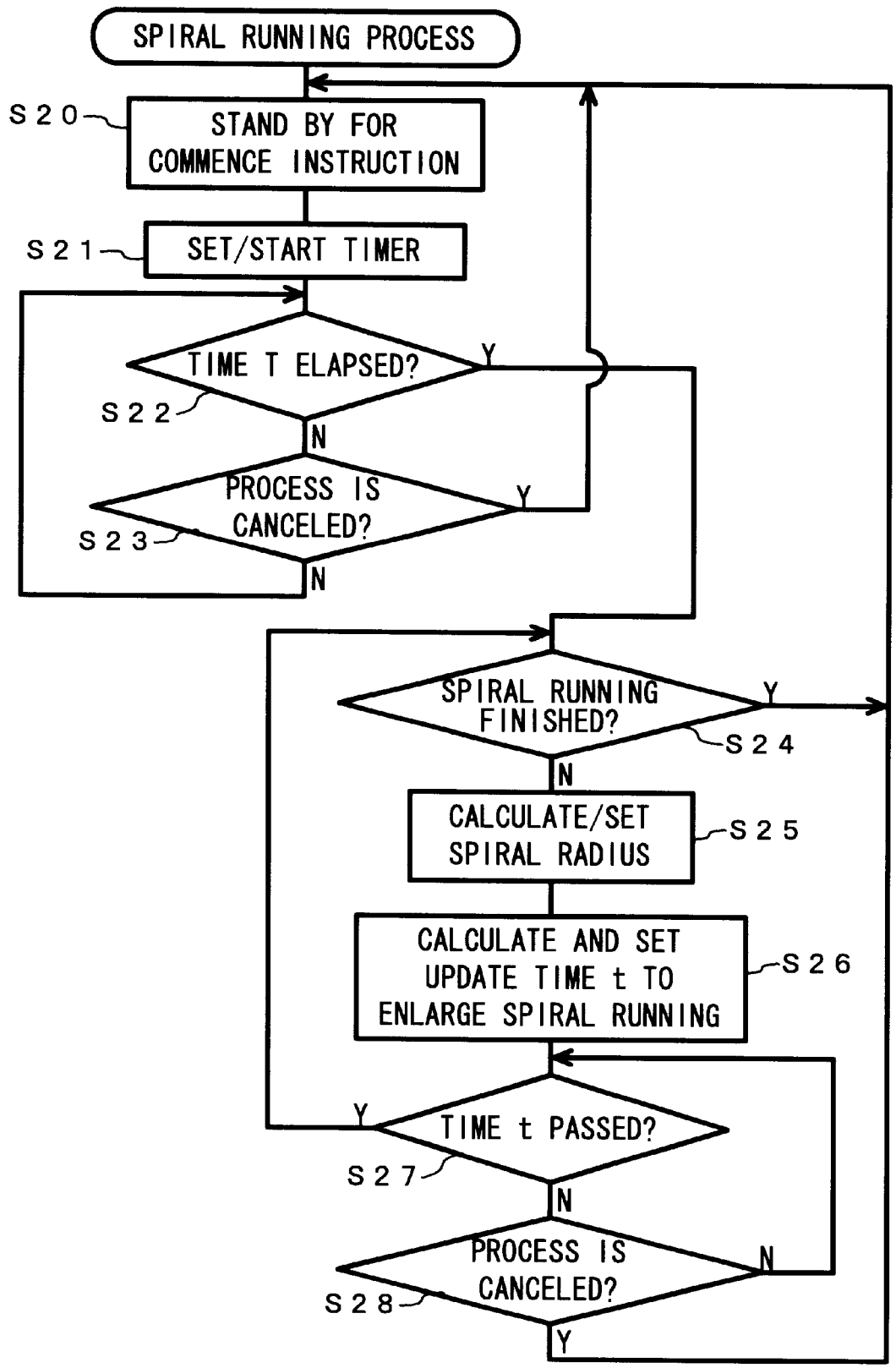
FIG. 14 is a flowchart showing control of the spiral pattern running motion.

Referring to FIG. 14, Step S20 stands by for receiving the instruction to start the spiral running from the swivel turn control module (Step S33). More particularly, the procedure stands by the issuance of the instruction from the swivel running control module after the swivel turn has been repeated a number N of times. Upon receiving the instruction, the time is set to the time T (e.g. 26 seconds), from the last of the number N of swivel turns to the start of the spiral running, and is started at Step S21. The instruction for starting the spiral running is released at substantially the moment when the last or N-th swivel turning motion starts up (at Step S33 in FIG. 15). The time T at Step S21, therefore, comprises a period for the backward running motion just before the swivel turn and a period for the swivel turn itself (Step S35 in FIG. 15). It is then examined at Step S22 whether or not the time T is elapsed. When so, the procedure advances to Step S24. Before the time T ends up, it is examined at Step S23 whether or not the cancellation of the operation is requested or not. If the cancellation of the operation is requested before the end of the time T, the procedure moves back to Step S20 for stand-by.

At Step S24, it is judged whether or not the spiral running motion is finished. When the distance from the robot 1 to the wall B or obstacle, which is found on the basis of the distance count of the sensors, is less than the predetermined distance, or when the detection output of the contact switch 5A produces a stop signal, it is then judged yes that the spiral running motion is finished at Step S24. Then, the procedure returns back to Step S20. If it is judged not that the spiral running motion is not finished, Step S25 follows. At Step S25, the speeds of the two treads 3, 4 for determining the size of a spiral or the radius of the turning motion are calculated and set. Since both of the motors 14, 15 are loaded with signals for realizing the calculated speeds of the two treads 3, 4, the spiral running motion is realized.

At Step S26, the time t for updating the speeds of the two treads 3, 4 is calculated to smoothly enlarge the spiral running motion and is set in the timer which is then started up. It is determined at Step S27, whether or not the time t has passed. When the time t has passed, the procedure returns back to Step S24. At Step S28, it is also determined whether or not the cancellation of the operation is requested. When the cancellation of the operation is not requested, Steps S27 and S28 are repeated until the time t is ended. If the cancellation of the operation is requested, the procedure goes back to step S20 and stays in stand-by.

Figure 15:
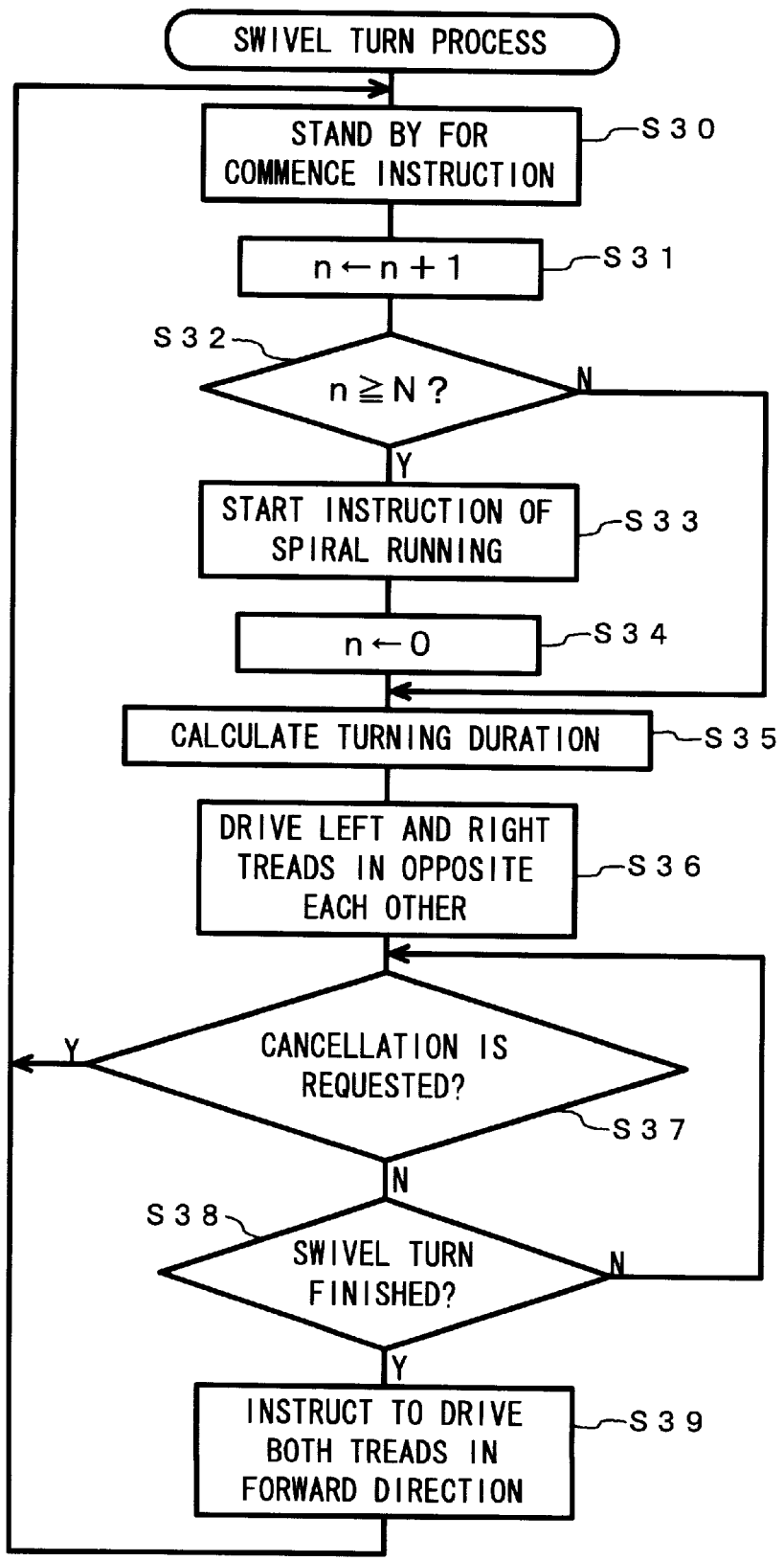
FIG. 15 is a flowchart showing control of a swivel turn motion.

Referring to the swivel turn control of FIG. 15, Step S30 stands by for receiving the instruction of starting the swivel turning process. At Step S31, the current number n of the swivel turn times (referred to as the swivel times hereinafter) is incremented (+1). It is determined at Step S32, whether or not the swivel times n catches up to the predetermined number N. Since the swivel times n is initialized to 0, the swivel times n becomes 1 in the first routine. If the swivel times n are judged not to catch up to the predetermined number N at Step S32, the procedure skips Step S33 and Step S34 and jumps to Step S35.

At Step S35, the duration of turning is calculated. Since the turning duration depends on the turning angle, it is determined in this embodiment in relation to the angle of 135 turning degrees specified for the fine-tuning random pattern running. After the calculation of the turning duration, the procedure moves to Step S36 where an instruction is made for driving the left tread 3 and the right tread 4 in opposite directions to each other. The rotating directions of the two treads 3, 4 are determined on the basis of the "turning direction" parameters shown in FIG. 13. It is then determined at Step S37, whether or not the cancellation is requested. If the cancellation is requested, the procedure returns back to Step S30. When the cancellation is not requested, it is judged at Step S38 whether or not the swivel turn is to be finished. When the swivel turn is to be finished, the procedure advances to Step S39 where an instruction is made for driving both the treads 3, 4 in the forward direction to shift the running mode to the basic straight forward running motion.

When the number of swivel times n is equal to the predetermined number N, the procedure moves from Step S32 to Step S33 for starting the spiral running motion. At Step S34, the number of swivel times n used for judging a repeat of the swivel turn is cleared to zero. This is followed by Steps S35 to S39 for finishing the cycle of the motor Nth swivel turn and return to Step S30 for staying in stand-by until the next available instruction is received. Although the instruction for starting the spiral running motion is released at Step S33, the spiral running motion starts after the time T has elapsed (FIG. 14). Thereby, the two control operations for the spiral running motion and the swivel turn will never overlap each other.

Figure 16:
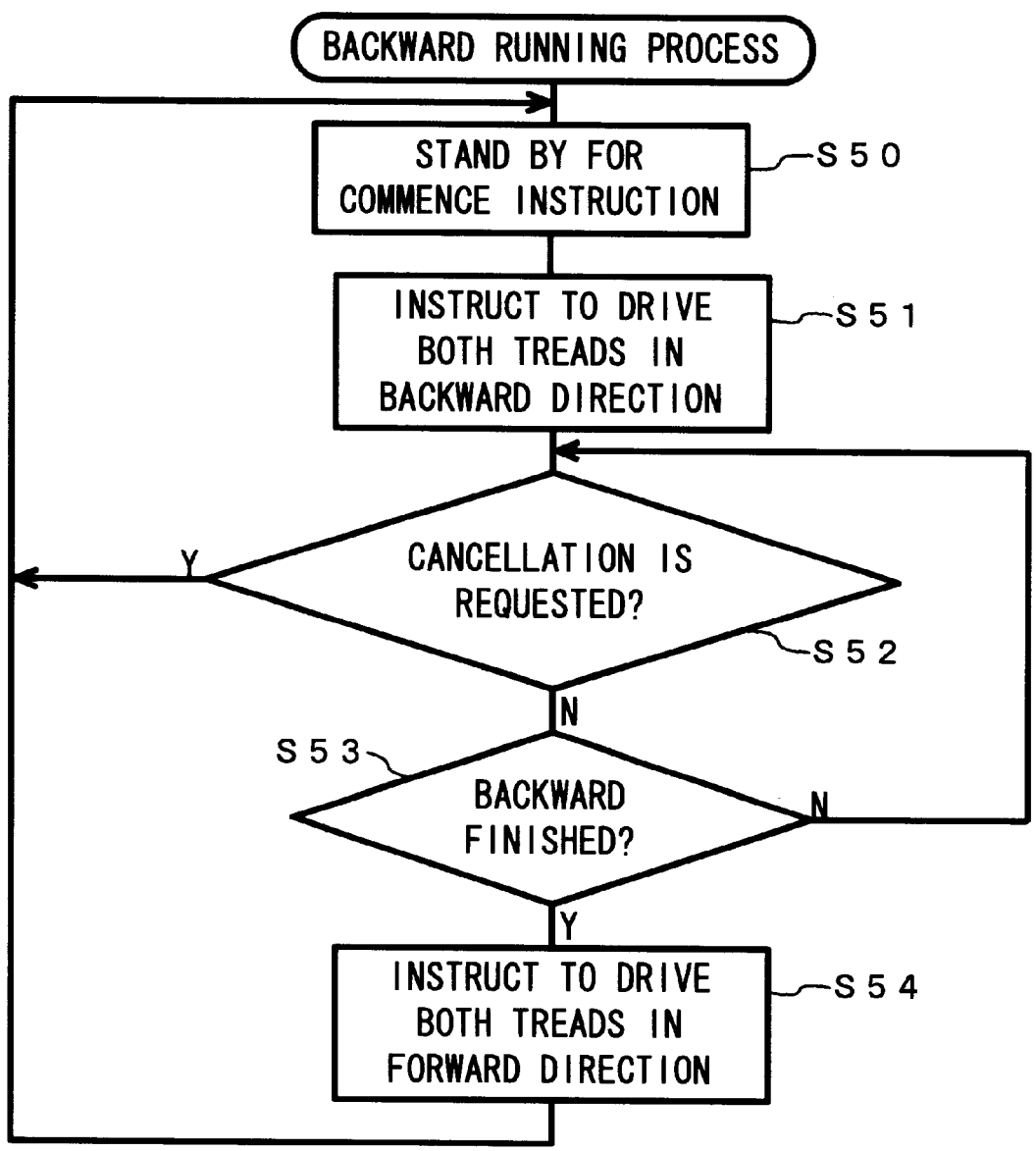
FIG. 16 is a flowchart showing control of a backward running motion.

Referring to FIG. 16 for the backward running process, Step S50 stands by for receiving an instruction. At Step S51, an instruction is issued for driving the two treads 3, 4 in the backward direction. It is then determined at Step S52, whether or not the cancellation of the operation is released. When so, the procedure returns back to Step S50. If not, the procedure goes to Step S53 where it is determined whether or not the duration for the backward running is ended. When the backward running has been finished, the procedure moves to Step S54 for driving the two treads 3, 4 in the forward direction.

The majority rule (for selection of the sensor output) in processing the outputs of the supersonic sensors (S180 in FIG. 10) will now be explained. The use of the majority rule is preferable for improving the reliability of acquired data (of the distance count) which may be susceptible to the environment of the supersonic sensor group 6. In this embodiment, when current data is acquired, the majority rule is applied to the current data and two old data to determine if the current data is available as new data. As shown in FIG. 17A, a margin m is provided above and below the preceding data MID, respectively. When the current data NEW is within the margin m, it is judged as a normal detection signal and used as the distance count.

If the current data NEW is outside of the margin m as shown in FIG. 17B, it is further determined whether or not the data OLD preceding the preceding data MID is within the margin m. When the data OLD is within the margin m, the preceding data MID is accepted as the normal detection signal and used as a new distance count in place of the current data NEW.

If both the data OLD and NEW are outside of the margin m of the preceding data MID, the current data NEW is used as the distance count because these three data are too much separated from each other and hardly identified as the normal detection signal.

According to the present invention, the following advantages are expected. As it is different from the use of the predetermined data of a running path for steering a mobile object precisely while detecting the position of the mobile object itself, the present invention allows a mobile robot to run throughout almost the entirety of a given area only by traveling in a combination of standardized spiral running and linear (random) running motion until the robot detects a boundary of the area or an obstacle.

Also, the optimum conditions for running throughout the area at higher efficiency are determined through a series of simulations and used for controlling the motion of the robot. The parameters for steering the robot are prepared based only on the detection outputs of their respective sensors mounted on both the left and right sides of the robot and used for determining by a priority rule the actual parameter to control the motion of the robot. The control units connected to the sensors on both the left and right sides are activated for calculating the provisional parameters exclusively of the other parameters and hence, are less complicated in their construction.

What is claimed is:

1. A mobile robot steering method in which a mobile robot, equipped with sensors on both sides of said robot for detecting a boundary of an given area to be covered, is controlled to run throughout said area, said method comprising the steps of:

conducting a spiral running motion which starts from any desired location in said area, wherein said spiral running motion has a radius which is gradually increased by a predetermined quantity;

when a distance between said robot and said boundary of said area, detected by said sensors, is smaller than a predetermined distance, discontinuing said spiral running motion, conducting a turning motion from a forward direction through a predetermined angle to part from said boundary of said area, and then conducting a forward running motion;

thereafter repeating, a similar turning and a similar forward running motion whenever detecting said boundary of said area; and resuming said spiral running motion at a first location spaced by a predetermined distance of a last forward running from a second location where a last turning motion conducted, when said turning motion has been repeated a predetermined number of times.

2. The mobile robot steering method according to claim 1, wherein there are a number of said turning motions before resuming said spiral running motion and a distance of said forward running motion from said second location of said last turning motion to said first location where said running motion is resumed are determined based upon data of simulation models so that a time required for running throughout almost an entirety of said area is minimized.

3. The mobile robot steering method according to claim 1, wherein said angle of turning is substantially 135 degrees from said forward direction.

4. The mobile robot steering method according to claim 1, wherein said sensors of said mobile robot includes at least one pair of obstacle sensors mounted on left and right front sides, and said mobile robot is controlled, while running, to detect said boundary which comprises walls with said obstacle sensors.

5. The mobile robot steering method according to claim 1, wherein said spiral running motion is conducted with a radius of circling being gradually increased so that no gap is developed between any two adjacent running traces of said robot.

6. The mobile robot steering method according to claim 1, wherein a distance of forward movement just before resuming said spiral running motion is defined by a time duration of said robot straight running.

7. A control device for a mobile robot in which a direction of running is determined by a direction of rotation and a speed of rotation of both left and right wheels of said robot, said control device comprising:

at least one of right side obstacle sensors mounted on a right front of a main body of said robot;

at least one of left side obstacle sensors mounted on a left front of said main body;

means for calculating a distance from said robot to an obstacle sensed by each of said right side and left side obstacle sensors;

means for exclusively generating at least two sets of run parameters based upon at least two distances calculated according to sensor outputs from at least one of each right side and left side obstacle sensors, wherein said run parameters include speed of each wheel; and means for determining a direction and a speed of rotation of each of said left and right wheels based upon a run parameter selected from said at least two sets of run parameters according to a priority rule predetermined for preventing collision against said obstacle.

8. The control device for a mobile robot according to claim 7, wherein said run parameters include at least said speed of rotation of each of said left and right wheels which is set to decrease in steps in proportion to a distance of said robot from said obstacle detected by said obstacle sensors.

9. The control device for a mobile robot according to claim 7, wherein said run parameters include said speed and said direction of rotation of said left and right wheels on an intra-side and a side opposite said intra-side of each of said obstacle sensor.

10. The control device for a mobile robot according to claim 9, wherein said run parameters further include a level of turning which represents a radius of circling.

11. The control device for a mobile robot according to claim 10, wherein a succeeding motion of said robot is determined by particular ones of said run parameters generated based upon detection outputs of said obstacle sensors on both left and right sides which provide a lower speed of rotation of each of said left and right wheels and a smaller radius of turning.

12. The control device for a mobile robot according to claim 7, wherein a priority is an order of, from highest, backward running, swivel turn, pivot turn, sharp turn, and slow turn.

13. The control device for a mobile robot according to claim 7, further comprising a contact sensor mounted on a front of said robot so that a pause control in response to an obstacle detection output of a contact sensor is implemented by timer interruption.

14. The control device for a mobile robot according to claim 7, where a succeeding motion of said robot is determined by a combination of said run parameters and said priority rule.

15. A mobile robot steering method in which a mobile robot equipped with sensors for detecting a boundary of a given area to be covered is controlled to run throughout substantially an entirety of said area, said method comprising the steps of:

conducting alternately spiral pattern running motions which start from at some locations in said area, wherein each radius of said spiral pattern running motions is gradually increased and random pattern running motions which are in response to a detection of said boundary of said area by said sensors, allow turning through a predetermined angle in a direction of departing from said boundary; and then running forward, in which a shift from said spiral pattern running motions to said random pattern running motions is carried out when said sensors detect that said robot comes close to a first predetermined distance from said boundary during said spiral pattern running motions and a shift from said random pattern running motions to said spiral pattern running motions is carried out when said robot has run a second predetermined distance from a last turning after said random pattern running motions have been repeated a predetermined number of times.

16. The mobile robot steering method according to claim 15, wherein said second predetermined distance is defined by a time duration of said run of said robot.

17. The mobile robot steering method according to claim 15, wherein at least one of said predetermined number of times of said turning through said predetermined angle and said second predetermined distance is determined in advance from simulation models so that an amount of time required for running throughout almost said entirety of said given area is minimized.

18. A control device for a mobile robot in which a direction of running is determined by a direction of rotation and a speed of rotation of both left and right wheels of said robot, said control device comprising:

at least one of right side obstacle sensors mounted on a right front of a main body of said robot;

at least one of left side obstacle sensors mounted on a left front of said main body;

means for calculating a distance from said robot to an obstacle sensed by each of said right side and left side obstacle sensors;

means for generating at least two sets of run parameters based upon at least two distances calculated according to sensor outputs from at least one of each right side and left side obstacle sensors, wherein said run parameters include speed of each wheel; and means for determining a direction and a speed of rotation of each of said left and right wheels based upon a run parameter selected from said at least two sets of run parameters according to a priority rule predetermined for preventing collision against said obstacle, said priority rule being a prioritization order from highest to lowest priority of different movement types of said mobile robot.

19. The control device for a mobile robot according to claim 18, wherein said priority rule is said prioritization order from highest to lowest priority for the movement types of backward running, swivel turn, pivot turn, sharp turn, and slow turn.

* * * * *